(12) United States Patent
Du et al.

(10) Patent No.: US 9,379,794 B2
(45) Date of Patent: Jun. 28, 2016

(54) SCHEDULING TRANSMISSION FOR MULTI-USER, MULTIPLE-INPUT, MULTIPLE-OUTPUT DATA

(71) Applicant: QUALCOMM Incorporated, San Diego, CA (US)

(72) Inventors: Shu Du, Milpitas, CA (US); Zhanfeng Jia, Belmont, CA (US); Ning Zhang, Saratoga, CA (US); Qinghai Gao, San Jose, CA (US); Balaji Srinivasan Babu, Tamil Nadu (IN)

(73) Assignee: QUALCOMM Incorporated, San Diego, CA (US)

( * ) Notice: Subject to any disclaimer, the term of this patent is extended or adjusted under 35 U.S.C. 154(b) by 940 days.

(21) Appl. No.: 13/633,849

(22) Filed: Oct. 2, 2012

(65) Prior Publication Data

US 2014/0092819 A1 Apr. 3, 2014

(51) Int. Cl.
*H04B 7/04* (2006.01)
*H04W 72/12* (2009.01)

(52) U.S. Cl.
CPC ......... *H04B 7/0452* (2013.01); *H04W 72/1221* (2013.01); *H04W 72/121* (2013.01)

(58) Field of Classification Search
None
See application file for complete search history.

(56) References Cited

U.S. PATENT DOCUMENTS

| | | | | |
|---|---|---|---|---|
| 6,201,793 | B1 * | 3/2001 | Chen | H04Q 11/0478 370/238 |
| 2007/0183380 | A1 * | 8/2007 | Rensburg | H04B 7/0452 370/338 |
| 2008/0101310 | A1 * | 5/2008 | Marzetta | H04B 7/0452 370/342 |
| 2008/0176577 | A1 * | 7/2008 | Bourlas | H04L 5/023 455/454 |
| 2010/0081448 | A1 * | 4/2010 | Wong | H04W 72/121 455/452.1 |
| 2010/0266057 | A1 * | 10/2010 | Shrivastava | H04L 5/0091 375/260 |
| 2010/0309834 | A1 * | 12/2010 | Fischer | H04B 7/0452 370/312 |
| 2010/0317364 | A1 * | 12/2010 | Zhang | H04W 16/04 455/452.2 |

(Continued)

OTHER PUBLICATIONS

Bellalta B. et al., "On the Performance of Packet Aggregation in IEEE 802.11 ac MU-MIMO WLANs", http://arxiv.org/abs/1204.0643, Jul. 26, 2012, XP055137373, Retrieved from the Internet: URL:http://arxiv.org/pdf/1204.0643v2.pdf, [retrieved on Aug. 29, 2014].

(Continued)

*Primary Examiner* — Ayaz Sheikh
*Assistant Examiner* — Faiyazkhan Ghafoerkhan
(74) *Attorney, Agent, or Firm* — Bever, Hoffman & Harms, LLP

(57) ABSTRACT

An access point determines the buffered data for each station of a plurality of stations in a BSS and groups the stations with similar station characteristics. The transmission time to the stations in a group can be apportioned. The groups can be ordered based on station characteristics and a transmission history. A sounding for a group can be performed based on the order. The MU-MIMO transmission for the group can be performed until a first condition is met. If the first condition is met, then the sounding and the MU-MIMO transmission for a next group can be performed, according to the order, until a second condition is met. The first condition can include an apportioned transmission time having expired and/or the buffers for the group being flushed. The second condition can include new data having been buffered by the AP and/or all buffered data having been transmitted.

42 Claims, 5 Drawing Sheets

(56) References Cited

U.S. PATENT DOCUMENTS

| | | | | |
|---|---|---|---|---|
| 2011/0002219 | A1* | 1/2011 | Kim | H04B 7/0417 370/203 |
| 2011/0002227 | A1* | 1/2011 | Sampath | H04W 72/121 370/248 |
| 2011/0064040 | A1* | 3/2011 | Kim | H04L 1/0631 370/329 |
| 2011/0096738 | A1* | 4/2011 | Choi | H04B 7/0452 370/329 |
| 2011/0188598 | A1* | 8/2011 | Lee | H04B 7/0452 375/267 |
| 2011/0188599 | A1* | 8/2011 | Kang | H04B 7/02 375/267 |
| 2011/0216659 | A1* | 9/2011 | Sampath | H04W 72/121 370/248 |
| 2011/0273977 | A1* | 11/2011 | Shapira | H04B 7/0452 370/208 |
| 2011/0274065 | A1* | 11/2011 | Oh | H04W 72/121 370/329 |
| 2011/0286402 | A1* | 11/2011 | Gong | H04L 1/1685 370/329 |
| 2012/0008572 | A1* | 1/2012 | Gong | H04W 72/1221 370/329 |
| 2012/0140753 | A1* | 6/2012 | Lee | H04B 7/0636 370/338 |
| 2012/0213122 | A1* | 8/2012 | Gong | H04B 7/0452 370/254 |
| 2013/0272211 | A1* | 10/2013 | Quan | H04B 7/0452 370/329 |
| 2014/0071955 | A1* | 3/2014 | Du | H04B 7/0452 370/336 |

OTHER PUBLICATIONS

Bellalta, B. et al. "On the Performance 1-39 of Packet Aggregation in IEEE 802.11 ac MU-MIMO WLANs", IEEE Communications Letters. IEEE Service Center, Piscataway, NJ, us. val. 16, No. 10, Oct. 1, 2012, pp. 1588-1591. XP011469235. ISSN: 1089-7798, DOI: 10.1109/LCOMM.2012.081612.120744 Title abstract Sections I-II figure 1.

Cai et al. "A Distributed Multi-User MIMO MAC Protocol for Wireless Local Area Networks", IEEE GLOBECOM Global Telecommunications Conference, Nov. 30, 2008, pp. 1-5, IEEE, XP031370635, ISBN: 978-1-4244-2324-8, DOI: 10.1109/GLOCOM.2008.EPC. 952.

International Search Report and Written Opinion—PCT/US2013/059317, International Search Authority—European Patent Office, Dec. 16, 2013.

* cited by examiner

SCHEDULING TRANSMISSION FOR MULTI-USER, MULTIPLE-INPUT, MULTIPLE-OUTPUT DATA

BACKGROUND OF THE DISCLOSURE

IEEE 802.11 refers to a set of standards for implementing wireless local area network (WLAN) communication in the, e.g., 2.4, 3.6, and 5 GHz frequency bands. WLAN communication allows a device to exchange data wirelessly with one or more other devices. Wi-Fi Alliance's mark Wi-Fi® is a brand name for WLAN products using any of the IEEE 802.11 standards. IEEE 802.11ac is a new standard being developed to support Very High Throughput (VHT) operations in 5 GHz frequency band. To obtain this VHT operation, an 802.11ac device uses a wide RF (radio frequency) bandwidth up to 160 MHz, up to 8 MIMO (multiple-input multiple-output, which refers to multiple antennas used at both the transmitter and receiver) spatial streams, MU-MIMO (which refers to an multi-user MIMO that allows a terminal to transmit (or receive) signals to/from multiple users in the same frequency band simultaneously), and a high-density modulation up to 256 QAM (quadrature amplitude modulation).

Beamforming is a technique using directional signal transmission or reception with multiple antennas to achieve spatial selectivity. For example, a transmitter can control the phase and amplitude of the signals at each antenna to create a pattern of constructive and destructive interference in the wavefront. To correctly form a beam for MIMO communication, the transmitter needs to know the channel state information (CSI). To obtain the CSI, the transmitter can send a known signal to a device, which allows that device to generate information regarding the channel. The device can then send this CSI back to the transmitter, which in turn can apply the correct phases and amplitudes to form the optimized beam directed at the device. This process is called channel sounding or channel estimation (referenced as the sounding process herein).

In 802.11ac communication, an access point (AP) can use the sounding process to collect CSI from one or more potential destination stations. Thereafter, the AP can use the collected CSI as the current channel estimation to send downlink data to multiple stations in a MU-MIMO frame. Note that the collected CSI can also be used to send downlink data to one station in an SU-MIMO frame, wherein SU-MIMO is a single-user MIMO (a beamforming technique using multiple antennas at one station).

SUMMARY OF THE EMBODIMENTS

A method of scheduling transmission for multi-user multiple-input, multiple-output (MU-MIMO) data in a wireless communication system is described. In this method, a plurality of stations in a basic service set (BSS) of an access point (AP) as well as the buffered data for those stations can be determined. At this point, the stations can be grouped into a plurality of groups, wherein the groups are prioritized for transmissions. In one embodiment, each group has stations with similar characteristics.

A sounding can be performed for a group based on the priority. The MU-MIMO transmission(s) for the group can be performed until a first condition is met. In one embodiment, the first condition includes a maximum transmission time for the MU-MIMO transmission having expired and/or buffers for the group being flushed. When the maximum transmission time for the MU-MIMO transmission has expired and/or the buffers for the group are flushed, a determination can be made whether any lower priority groups with buffered data remain. For each lower priority group with buffered data, the steps of performing the sounding and the MU-MIMO transmission can be repeated based on the prioritizing. When no lower priority group with buffered data remains, then the method returns to the step of determining a plurality of stations in the BSS.

In one embodiment, grouping the stations into a plurality of groups based on similar station characteristics can include grouping the stations based on similar amounts of buffered data. In another embodiment, grouping the stations into a plurality of groups can include grouping the stations based on similar types of buffered data. In yet another embodiment, grouping the stations into a plurality of groups can include grouping the stations based on the freshness of their CSIs.

Another method of scheduling transmission for multi-user multiple-input, multiple-output (MU-MIMO) data in a wireless communication system is described. In this method, a plurality of stations in a basic service set (BSS) of an access point (AP) as well as the buffered data for each station of the plurality of stations can be determined. At this point, the stations can be grouped into a plurality of groups, each group having similar station characteristics.

The transmission time can be apportioned to stations in each group. In one embodiment, this apportionment provides for the proportional distribution of transmission time (a limited resource) among the stations (competing entities for the limited resource) based on transmission history (when available). In another embodiment, the apportionment can be based on one or more predetermined policies (e.g. specific customers, type of data, etc.). In one embodiment, the apportioning can include re-apportioning the transmission time of the stations when transmission history is available.

The groups can be ordered based on the characteristics and transmission history, when available/present. In one embodiment, the ordering can include reordering the plurality of groups when transmission history is available.

A sounding can be performed for a group based on the order. The MU-MIMO transmission(s) for the group can be performed until a first condition is met. In one embodiment, the first condition can include a maximum transmission time for the MU-MIMO transmission having expired and/or buffers for the group being flushed. When the maximum transmission time for the MU-MIMO transmission has expired and/or the buffers for the group are flushed, a determination can be made whether a second condition is met. In one embodiment, the second condition can include new data having been received and buffered by the AP and/or all buffered data having been transmitted. When the second condition is not met, then the method returns to performing the sounding for the next group based on the current order. When the second condition is met, then the method returns to determining a plurality of stations in the BSS of the AP.

An electronic device is also described. This electronic device, along with other components, includes a processor block and a communication block. The communication block includes a dynamic scheduling block, which is configured to perform the above-described steps.

A non-transitory, computer-readable medium storing computer-executable instructions is also described. These instructions can advantageously perform dynamic scheduling for an access point. The instructions when executed by a processor cause the processor to execute a process comprising the above-described steps.

DETAILED DESCRIPTION OF THE DRAWINGS

Figure 1A:
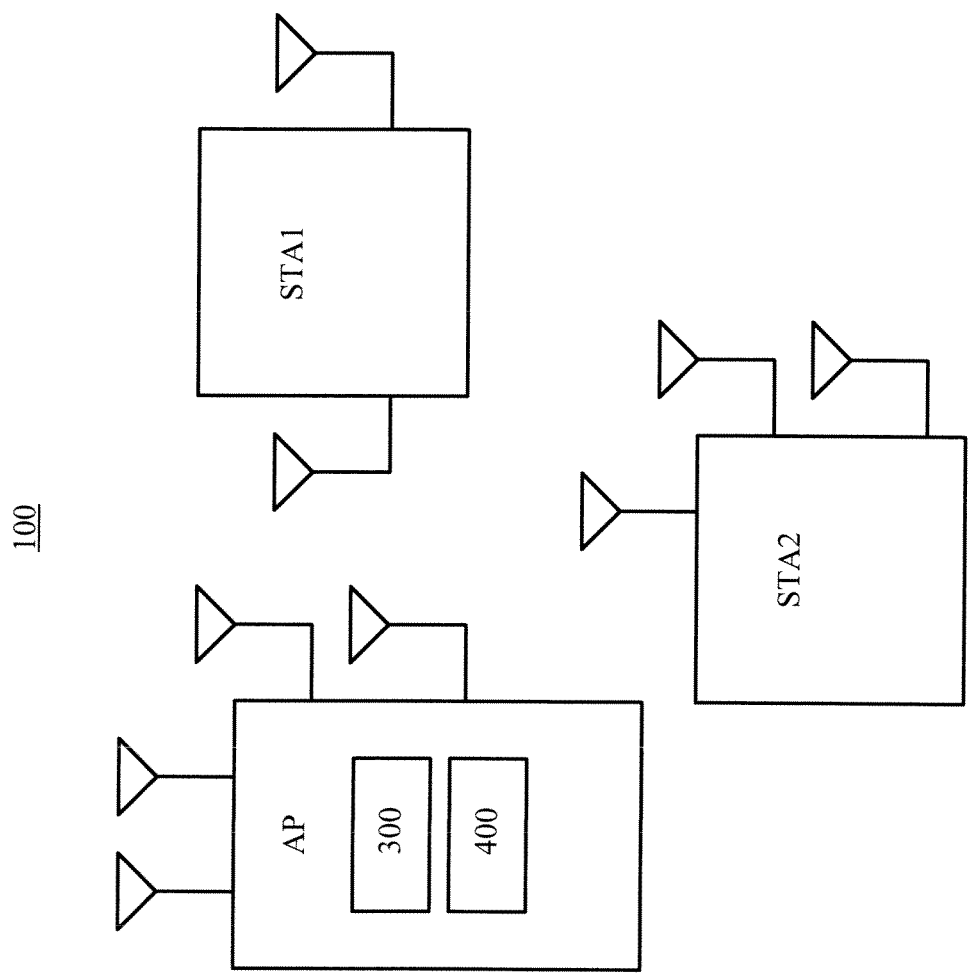
FIG. 1A illustrates a small basic service set (BSS) including an AP and two stations STA1 and STA2.
Figure 1B:
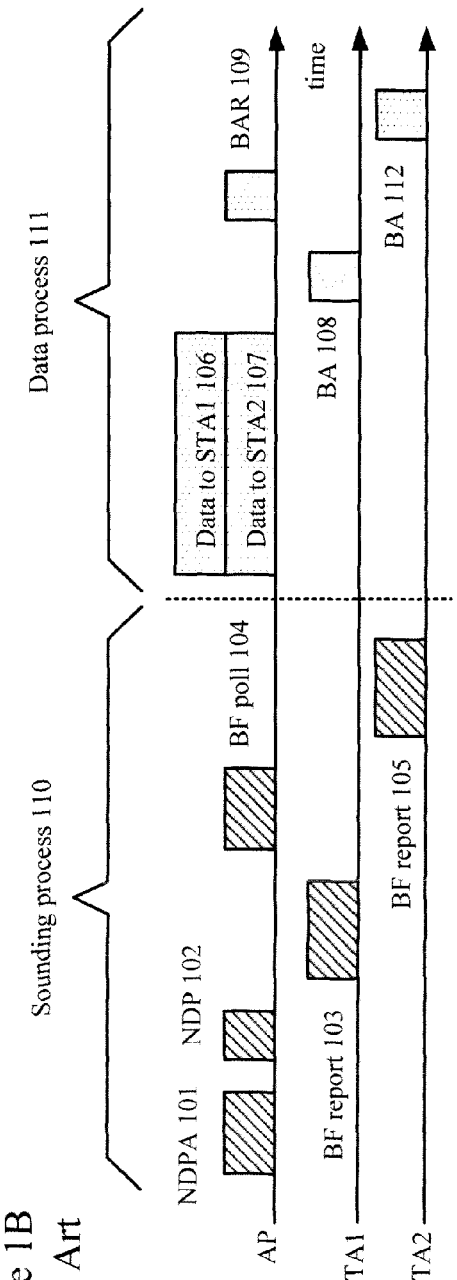
FIG. 1B illustrates an exemplary prior art communication between an AP and two stations, the communication including a sounding process and a data process.

FIG. 1A illustrates a small basic service set (BSS) 100 including an AP and two stations STA1 and STA2. Techniques 300 and 400, which can be performed by the AP, are discussed below in reference to FIGS. 3 and 4, respectively. In one embodiment, each device includes a transceiver (transmitter and receiver) configured for operation in accordance with the 802.11ac standard. FIG. 1B illustrates an exemplary communication between the AP and the stations STA1 and STA2. This exemplary communication can be characterized as including two processes: a sounding process 110 and a data process 111. Sounding process 110 begins with the AP sending a null data packet announcement (NDPA) signal 101 to stations STA1 and STA2, wherein the NDPA signal 101 indicates that no data will be sent in the subsequent packet. Following the NDPA signal 101, the AP sends a null data packet (NDP) signal 102. This NDP signal 102 can serve as the known signal for obtaining channel characteristics from the stations STA1 and STA2. In accordance with the 802.11ac standard, after receipt of NDP signal 102, station STA1 can send its CSI in a beamforming (BF) report signal 103 to the AP. After receipt of BF report signal 103, the AP can send a BF poll signal 104 indicating that the station STA2 can send its CSI. After receipt of BF poll signal 104, the station STA2 can then send its CSI in a BF report signal 105 to the AP.

Using the CSI from its associated stations STA1 and STA2, the AP can begin the data process 111 by concurrently sending MU-MIMO data 106 to station STA1 and MU-MIMO data 107 to station STA2. Note that although the term MU-MIMO is used to describe the data, the data may also be SU-MIMO in other embodiments. After receiving the MU-MIMO data 106, the station STA1 can send a block acknowledgement (BA) signal 108 to the AP. After receipt of BA signal 108, the AP can send a block acknowledgement request (BAR) signal 109 for the station STA2. After receipt of BAR signal 109, the station STA2 can send its BA signal 112 in response to the AP. Note that although FIG. 1 shows an AP associated with two stations, in other embodiments the AP can be associated with any number of stations, each of which can send a BF report signal during the sounding process 110 and a BA signal during the data process 111.

Figure 2:
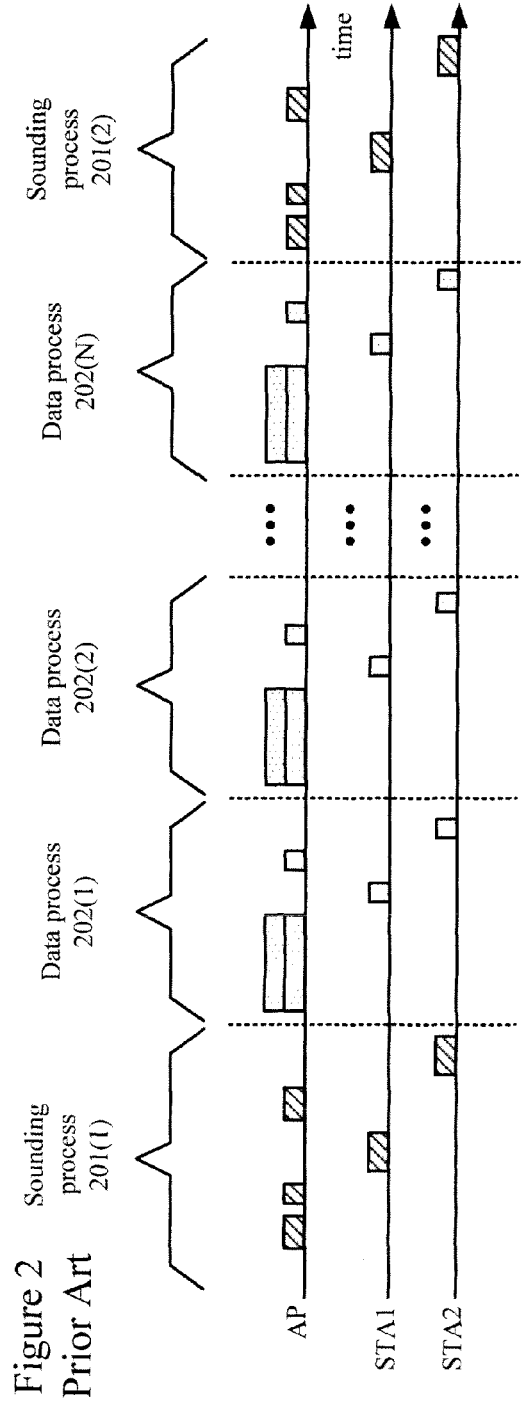
FIG. 2 illustrates an exemplary prior art communication between an AP and two stations in which the sounding process is performed periodically, i.e. after a predetermined number of data processes.

Because the sounding process has a large overhead in terms of medium air time, the AP is typically configured not to do sounding prior to every MU-MIMO data transmission. For example, FIG. 2 illustrates a first sounding process 201(1) followed by a plurality of data processes 202(1)-202(N), wherein N is an integer greater than 2. After the N data processes are complete, a second sounding process 201(2) is performed before another plurality of data processes are performed (not shown).

When the MU-MIMO data is sent out immediately after a sounding process, the CSI used for MU-MIMO data transmission is fresh. Therefore, the data packets will have a high chance of being successfully received. In contrast, if the MU-MIMO data is sent out after some time duration since the last sounding process, e.g. after N data packets in FIG. 2, the CSI used in generating the MU-MIMO data transmission can be stale. Therefore, in that case, the data packets may have a low chance of being successfully received.

A standard data scheduling algorithm in a Wi-Fi Certified AP assigns equal shares of time to different stations. For example, the data scheduler performs a round-robin on all the stations, in which case, the AP will serve one station and then move on to the next station, and so on. However, the quality of the CSI returned by a sounding process can significantly deteriorate when the CSI is used for MU-MIMO transmissions. Indeed, even 20 msec after sounding, the SINR of a MU-MIMO communication can degrade to an unacceptably low level. Based on this degradation, using a standard round-robin data scheduling process, if the AP performs sounding for a first station before its MU-MIMO transmission, the CSI would be stale by the time the AP returns to the first station.

Therefore, a need arises for a method and system that provides a dynamic scheduling for MU-MIMO communications, thereby keeping CSI fresh.

Various dynamic data scheduling techniques are described. In general, each of these dynamic data scheduling techniques groups stations into a plurality of groups. In one embodiment, a sounding for each group is performed immediately before transmission(s) to the group, thereby ensuring that CSI is fresh. Using fresh CSI can significantly improve MU-MIMO communication performed in accordance with the 802.11ac standard.

Figure 3:
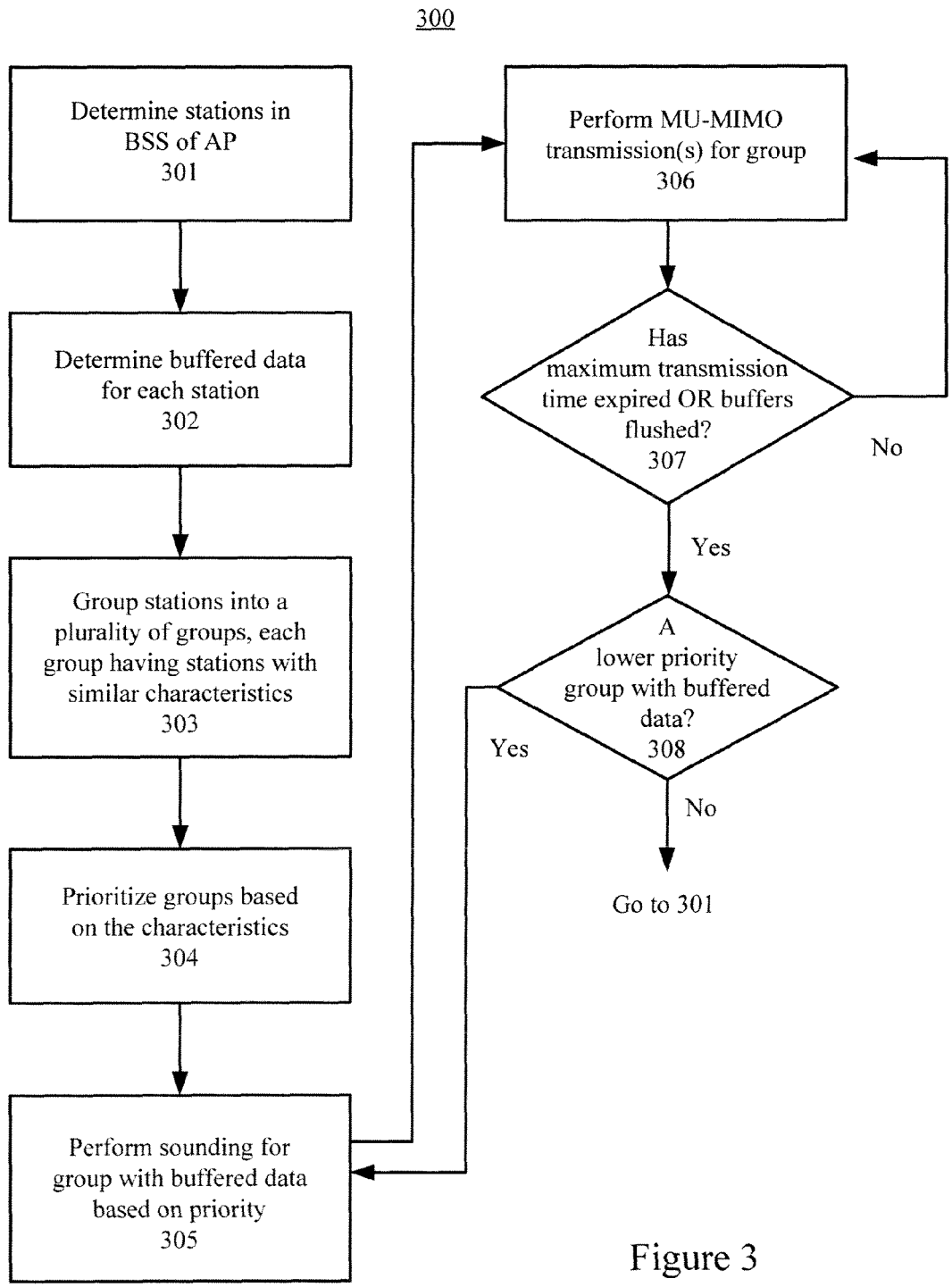
FIG. 3 illustrates an exemplary data scheduling technique that provides sounding before transmission to each group of stations, the groups being ordered by priority.

FIG. 3 illustrates an exemplary data scheduling technique 300 for MU-MIMO data transmission in a wireless communication system. In one embodiment, an AP can perform steps 301-308. In step 301, a plurality of stations in a basic service set (BSS) of an access point (AP) can be determined. The buffered data for each station of the plurality of stations can be determined in step 302. The stations can be grouped into a plurality of groups in step 303, wherein each group will receive one or more MU-MIMO transmissions. In a preferred embodiment, stations with similar characteristics can be grouped together. In one embodiment, stations with similar amounts of data can be placed in the same group. In another embodiment, stations with similar types of data, e.g. streaming media, voice, etc., can be placed in the same group. In yet another embodiment, stations with similar CSI freshness can be placed in the same group. The groups can be prioritized based on similar characteristics in step 304. For example, when stations are grouped based on having similar amounts of data, the groups can be prioritized based on the amount of buffered data (e.g. total amount of data in the group or the average amount of data for each station in the group). In one embodiment, the highest priority is given to the group with the most buffered data and the lowest priority is given to the group with the least buffered data. When stations are grouped based on having similar types of data, the groups can be prioritized based on the network/system objective(s). In one embodiment, the highest priority is given to the group with streaming media and the lowest priority is given to the group with non-streaming, non-voice data. When stations are grouped based on having similar CSI freshness, the groups can be prioritized based on their last update. In one embodiment, the highest priority is given to the group with least fresh CSI and the lowest priority is given to the group with the freshest CSI.

A sounding for the group can be performed with buffered data based on the priority in step 305. MU-MIMO transmission(s) can be performed for the group in step 306 until a maximum transmission time has expired and/or the buffers of that group are flushed, as determined in step 307.

When the maximum transmission time has expired and/or the buffers of that group are flushed, a determination is made in step 308 whether a lower priority group with buffered data is present. If so, then technique 300 returns to performing a new sounding for that group in step 305. If a lower priority group is not present, then technique 300 returns to determining the stations in the BSS of the AP in step 301.

Figure 4:
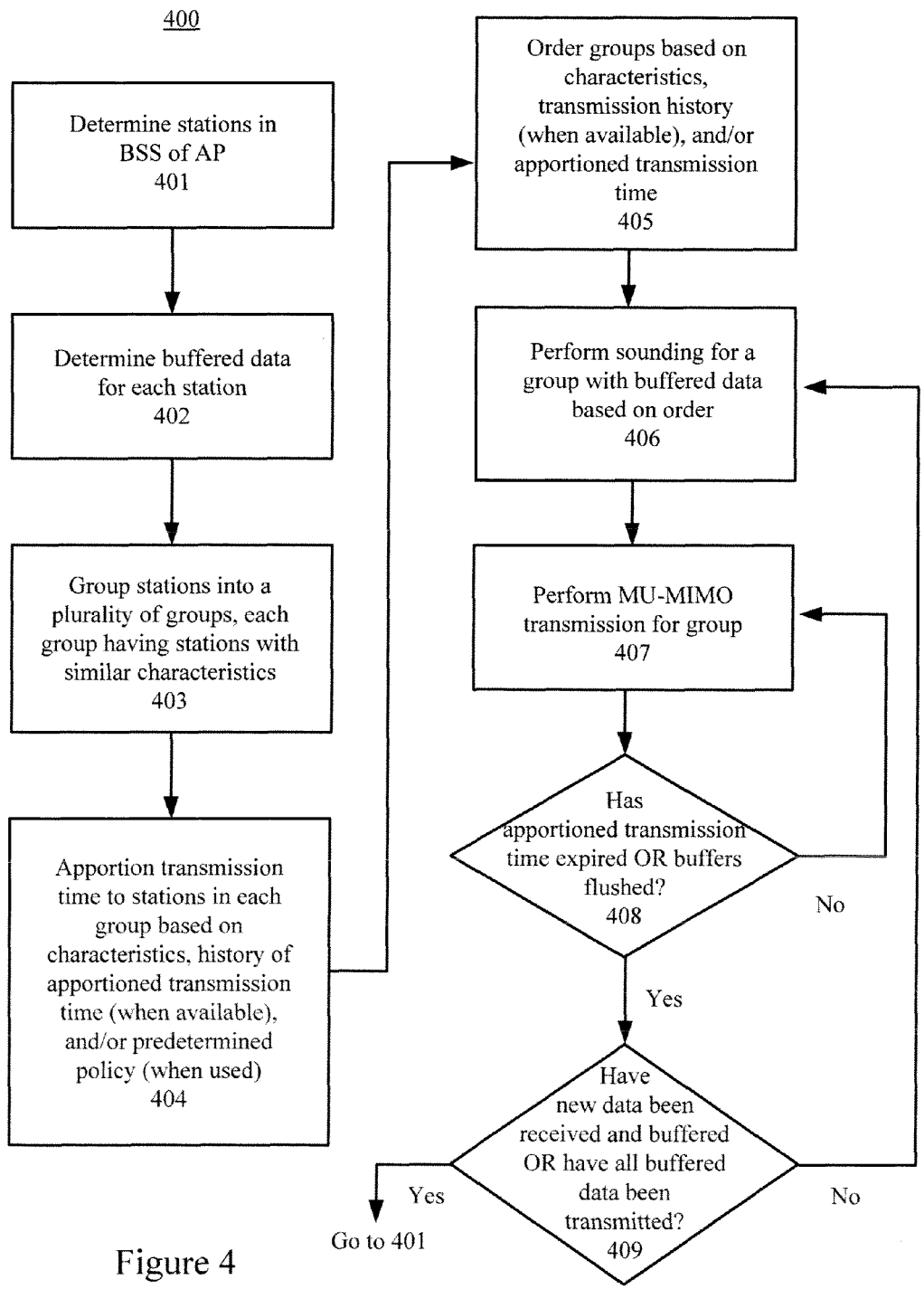
FIG. 4 illustrates another exemplary data scheduling technique that provides sounding before transmission to each group of stations, the groups being ordered based on characteristics and transmission history, when available.

FIG. 4 illustrates another exemplary data scheduling technique 400 for MU-MIMO data transmission in a wireless communication system. In one embodiment, an AP can perform steps 401-409. In step 401, a plurality of stations in a BSS of an AP can be determined. The buffered data for each station of the plurality of stations can be determined in step 402. The stations can be grouped into a plurality of groups in step 403, wherein each group will receive one or more MU-MIMO transmissions. In a preferred embodiment, stations with similar characteristics can be grouped together. In one embodiment, stations with similar amounts of data can be placed in the same group. In another embodiment, stations with similar types of data, e.g. streaming media, voice, etc., can be placed in the same group. In yet another embodiment, stations with similar CSI freshness can be placed in the same group.

The transmission time to stations in each group can be apportioned in step 404 based on characteristics, the history of apportioned transmission time (when available), and/or predetermined policy (when used). In one embodiment, this apportionment provides for the proportional distribution of transmission time (a limited resource) among the stations (competing entities). For example, assume there are four stations STA1, STA2, STA3, and STA4. One apportionment can provide 2 time units to STA1, 2 time units to STA2, 1 time unit to STA3, and 3 time units to STA4. A time unit can refer to a specific unit of time (a millisecond, a second, etc.), a relative time based on total time allotted to the group (e.g. total time of 16 milliseconds for the group, therefore each time unit=2 milliseconds), or an arbitrary period of time (e.g. 3.7 milliseconds=1 time unit). For each subsequent pass through step 404 (i.e., with transmission history), the apportionment can be changed (re-apportionment) to provide more equal transmission times between stations. For example, using the above apportionment for the first pass, a second pass can provide 2 time units to STA1, 2 time units to STA2, 3 time units to STA3, and 1 time units to STA4. Note that such equalization may take place over multiple passes. In another embodiment, apportioning the transmission time can include taking into account one or more predetermined policies. For example, one policy can include providing more transmission time to certain customers. Another policy can include providing more transmission time when streaming video traffic or another type of data (i.e. a characteristic of the data) is being transmitted.

The groups can be ordered in step 405 based on the characteristics and/or apportioned transmission time. For example, when stations are grouped based on having similar amounts of data, the groups can be ordered based on the amount of buffered data (e.g. total amount of data in the group or the average amount of data for each station in the group). In one embodiment, the order can start with the group with the most buffered data and end with the group with the least buffered data. When stations are grouped based on having similar types of data, the groups can be ordered based on the network/system objective(s). In one embodiment, the order can start with the group of station having streaming media and end with the group of stations having non-streaming, non-voice data. When stations are grouped based on having similar CSI freshness, the groups can be ordered based on their last update. In one embodiment, the order can start with the group of stations having the least fresh CSIs and end with the group of stations having the freshest CSIs. In one embodiment, the order can start with the group with the most aggregated apportioned transmission time and end with the group with the least aggregated apportioned transmission time.

In one embodiment, the groups can also be ordered based on their transmission history, when available/present. For example, when one or more groups have had at least one transmission opportunity, then an ordering different than that for previous transmission passes (i.e. a re-ordering) can be provided in step 405, thereby resulting in a more equitable transmission between groups. For example, assuming that a first pass of step 405 provides a group order of GRP1, GRP2, GRP3, and GRP4, then a second pass of step 405 can provide a group order of GRP4, GRP3, GRP2, and GRP1. Note that an order reversal is only one type of ordering for a non-first pass of step 405. Other types of group reordering for second, third, etc. passes of step 405 can be used. For example, in one embodiment, a group shift can be used such that a first pass ordering is GRP1, GRP2, GRP3, and GRP4; a second pass ordering is GRP2, GRP3, GRP4, and GRP1; a third pass is GRP3, GRP4, GRP1, and GRP2.

A sounding for the group can be performed with buffered data based on the order in step 406. MU-MIMO transmission(s) for the group can be performed in step 407 until a first condition is met (step 408). In one embodiment, the first condition can include an apportioned transmission time having expired and/or the buffers of that group being flushed.

When at least one of the maximum transmission time has expired and the buffers of that group are flushed, a determination can be made in step 409 whether a second condition is met. In one embodiment, the second condition can include at least one of new data having been received and buffered by the AP, and all buffered data having been transmitted. If the second condition is not met, then steps 406-409 can be repeated following the order of that pass (i.e. of step 405), until either new data have been received and buffered by the AP, or all buffered data have been transmitted. In that case, then the method returns to determining a plurality of stations in the BSS of the AP in step 401. Note that because the stations of a typical BSS do not rapidly change, the groups formed during a previous step 403 will generally remain viable, thereby allowing the pass modifications for step 405 described above.

In one embodiment, one or more of the data scheduling techniques 300 and 400 shown and described in reference to FIGS. 3 and 4, respectively, can be implemented in an AP (see, e.g., the AP of FIG. 1A). Certain aspects of the data scheduling techniques 300, 400 described in FIGS. 3 and 4, respectively, may take the form of an entirely software embodiment (including firmware, resident software, microcode, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions (e.g., executable by one or more processing units). In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
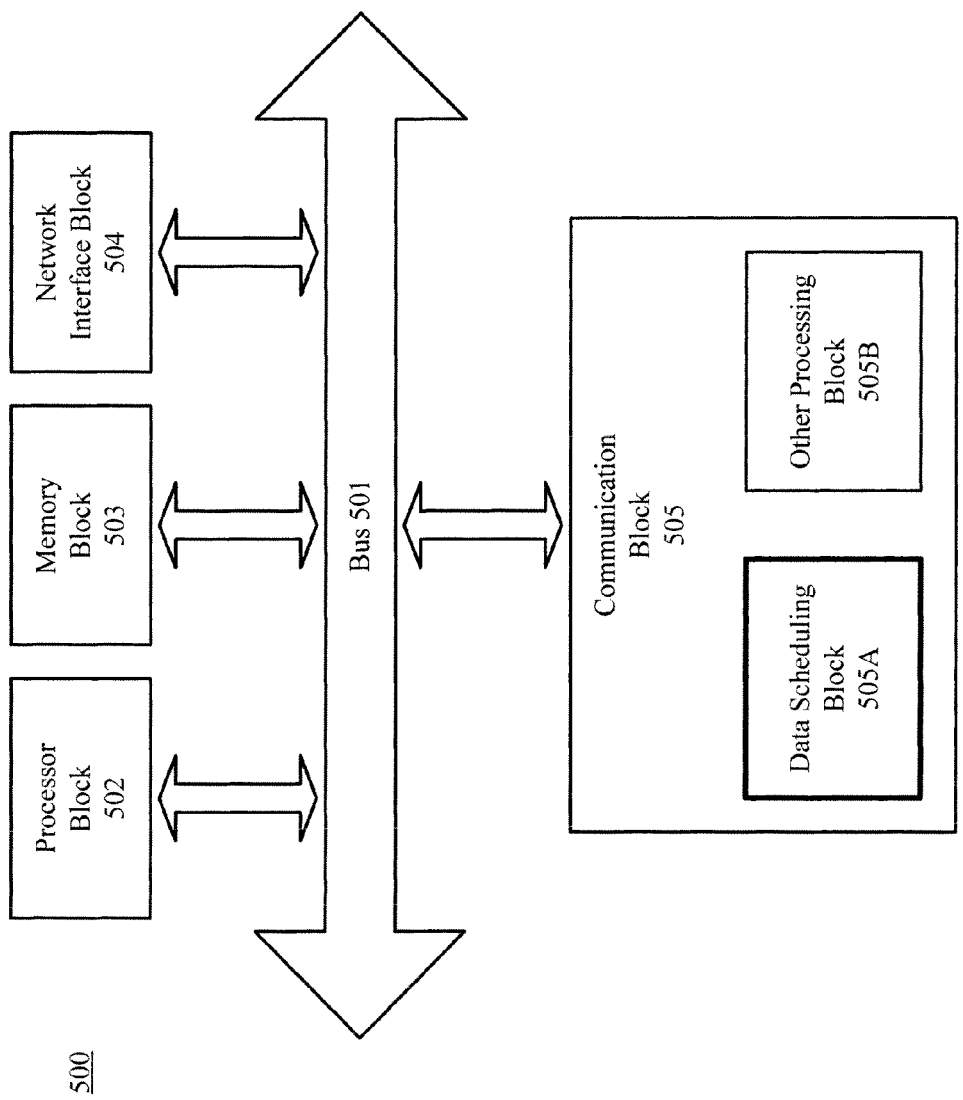
FIG. 5 illustrates an exemplary electronic device configured to implement at least one of the data scheduling techniques of FIGS. 3, 4, and 5.

Although the data scheduling techniques are described as being performed by an AP, an electronic device having wireless capability typically includes certain components that may or may not be characterized as part of an AP. Indeed, in some embodiments, certain components of the electronic device may be characterized as outside the AP, but still assist in one or more steps of the data scheduling technique. FIG. 5 illustrates a simplified electronic device 500 including a data scheduling block 505A, which can substantially perform at least one of the data scheduling techniques 300 and 400. The electronic device 500 may be a notebook computer, a desktop computer, a tablet computer, a netbook, a mobile phone, a gaming console, a personal digital assistant (PDA), or other electronic system having wireless (and wired, in some cases) communication capabilities.

The electronic device 500 can include a processor block 502 (possibly including multiple processors, multiple cores, multiple nodes, and/or implementing multi-threading, etc.). The electronic device 500 can also include a memory block 503, which may include cache, SRAM, DRAM, zero capacitor RAM, Twin Transistor RAM, eDRAM, EDO RAM, DDR RAM, EEPROM, NRAM, RRAM, SONOS, PRAM, and/or another type of memory cell array. The electronic device 500 also includes a network interface block 504, which may include at least a WLAN 802.11 interface. Other network interfaces may include a Bluetooth interface, a WiMAX® interface, a ZigBee® interface, a Wireless USB interface, and/or a wired network interface (such as an Ethernet interface, or a powerline communication interface, etc.). The processor block 502, the memory block 503, and the network interface block 504 are coupled to a bus 501, which may be implemented in accordance with PCI, ISA, PCI-Express, HyperTransport®, InfiniBand®, NuBus, AHB, AXI, or another bus standard.

The electronic device 500 also includes a communication block 505, which can include the above-described data scheduling block 505A and another processing block 505B. The other processing block 505B may include, but is not limited to, portions of a transceiver for processing received signals, for processing to be transmitted signals, and for coordinating actions of the receiver and transmitter portions. Other embodiments may include fewer or additional components not illustrated in FIG. 5, such as video cards, audio cards, additional network interfaces, and/or peripheral devices. In one embodiment, the memory block 503 may be connected directly to the processor block 502 to increase system processing.

The various embodiments of the structures and methods of described above are illustrative only and are not intended to limit the scope of the dynamic sounding technique and system embodiments described. Note that the data scheduling techniques described herein can be easily incorporated into 802.11-compliant systems, and are fully consistent with the communication shown in FIG. 1B between various wireless devices.

The invention claimed is:

1. A method of scheduling transmission for multi-user, multiple-input, multiple-output (MU-MIMO) data in a wireless communication system, the method comprising:
   determining a plurality of stations in a basic service set (BSS) of an access point (AP);
   determining buffered data for each station of the plurality of stations;
   grouping the plurality of stations into a plurality of groups, with the stations of a group having similar characteristics;
   prioritizing the plurality of groups for transmissions based on the characteristics of the stations of the plurality of groups;
   performing a sounding for a group based on the prioritizing;
   performing MU-MIMO transmission for the group based on the sounding until a first condition has been met;
   when the first condition has been met, then determining whether a lower priority group with buffered data exists; and
   for the lower priority group with buffered data, repeating performing the sounding and the MU-MIMO transmission.

2. The method of claim 1, wherein the first condition includes at least one of a maximum transmission time for the MU-MIMO transmission having expired and buffers for the group being flushed.

3. The method of claim 1, wherein grouping the stations into a plurality of groups includes grouping the stations based on similar amounts of buffered data.

4. The method of claim 1, wherein grouping the stations into a plurality of groups includes grouping the stations based on similar types of buffered data.

5. The method of claim 1, wherein grouping the stations into a plurality of groups includes grouping the stations based on similar freshness of channel state information.

6. A method of scheduling transmission for multi-user, multiple-input, multiple-output (MU-MIMO) data in a wireless communication system, the method comprising:
   determining a plurality of stations in a basic service set (BSS) of an access point (AP);

determining buffered data for each station of the plurality of stations;

grouping the plurality of stations into a plurality of groups, with the stations of a group having similar characteristics;

ordering the plurality of groups for transmissions based on the characteristics of the stations and a transmission history for the stations;

apportioning transmission time to the stations in a group;

performing a sounding for the group based on the order;

performing MU-MIMO transmission for the group based on the sounding until a first condition is met;

when the first condition is met, then determining whether a second condition is met; and repeating the performing of the sounding and the performing of the MU-MIMO transmission until the second condition is met.

7. The method of claim 6, wherein the first condition includes at least one of an apportioned transmission time for the MU-MIMO transmission having expired and the buffers for the group being flushed.

8. The method of claim 6, wherein the second condition includes at least one of new data having been buffered by the AP and all buffered data having been transmitted.

9. The method of claim 6, wherein grouping the stations into a plurality of groups includes grouping the stations based on similar amounts of buffered data.

10. The method of claim 6, wherein grouping the stations into a plurality of groups includes grouping the stations based on similar types of buffered data.

11. The method of claim 6, wherein grouping the stations into a plurality of groups includes grouping the stations based on similar freshness of channel state information.

12. The method of claim 6, wherein the ordering includes reordering the plurality of groups based on transmission history.

13. The method of claim 6, wherein the apportioning includes re-apportioning the stations of each group based on transmission history.

14. The method of claim 6, wherein apportioning transmission time to the stations in the group results in different time units being apportioned to different stations in the group for the MU-MIMO transmission.

15. An electronic device comprising:
a processor block; and
a communication block, the communication block including:
a dynamic scheduling block configured to perform:
determining a plurality of stations in a basic service set (BSS) of an access point (AP);
determining buffered data for each station of the plurality of stations;
grouping the stations into a plurality of groups, the stations of a group having similar characteristics;
prioritizing the plurality of groups for transmissions based on the characteristics of the stations of the plurality of groups;
performing a sounding for a group based on the prioritizing;
performing multi-user multiple-input, multiple-output (MU-MIMO) transmission for the group based on the sounding until a first condition is met;
when the first condition is met, then determining whether a lower priority group with buffered data exists; and
for the lower priority group with buffered data, repeating performing the sounding and the MU-MIMO transmission.

16. The electronic device of claim 15, wherein the first condition includes at least one of a maximum transmission time for the MU-MIMO transmission having expired and the buffers for the group being flushed.

17. The electronic device of claim 15, wherein grouping the stations into a plurality of groups includes grouping the stations based on similar amounts of buffered data.

18. The electronic device of claim 15, wherein grouping the stations into a plurality of groups includes grouping the stations based on similar types of buffered data.

19. The electronic device of claim 15, wherein grouping the stations into a plurality of groups includes grouping the stations based on similar freshness of channel state information.

20. An electronic device comprising:
a processor block; and
a communication block, the communication block including:
a dynamic scheduling block to perform:
determining a plurality of stations in a basic service set (BSS) of an access point (AP);
determining buffered data for each station of the plurality of stations;
grouping stations in the plurality of stations into a plurality of groups, the stations of a group having similar characteristics;
ordering the plurality of groups for transmissions based on the characteristics of the stations and a transmission history for the stations;
apportioning transmission time to the stations in a group;
performing a sounding for the group based on the order;
performing multi-user multiple-input, multiple-output (MU-MIMO) transmission for the group based on the sounding until a first condition is met;
when a first condition is met, then determining whether a second condition is met; and
repeating the performing of the sounding and the performing of the MU-MIMO transmission until the second condition is met.

21. The electronic device of claim 20, wherein the first condition includes at least one of a maximum transmission time for the MU-MIMO transmission having expired and the buffers for the group being flushed.

22. The electronic device of claim 20, wherein the second condition includes at least one of new data having been buffered by the AP and all buffered data having been transmitted.

23. The electronic device of claim 20, wherein grouping the stations into a plurality of groups includes grouping the stations based on similar amounts of buffered data.

24. The electronic device of claim 20, wherein grouping the stations into a plurality of groups includes grouping the stations based on similar types of buffered data.

25. The electronic device of claim 20, wherein grouping the stations into a plurality of groups includes grouping the stations based on similar freshness of channel state information.

26. The electronic device of claim 20, wherein the ordering includes reordering the plurality of groups based on transmission history.

27. The electronic device of claim 20, wherein the apportioning includes re-apportioning the stations of each group based on transmission history.

28. The electronic device of claim 20, wherein apportioning transmission time to the stations in the group results in different time units being apportioned to different stations in the group for the MU-MIMO transmission.

29. A non-transitory, computer-readable medium storing computer-executable instructions for performing dynamic scheduling of soundings, the instructions when executed by a processor cause the processor to execute a process comprising:
determining a plurality of stations in a basic service set (BSS) of an access point (AP);
determining buffered data for each station of the plurality of stations;
grouping the stations into a plurality of groups, the stations of a group having similar characteristics;
prioritizing the plurality of groups for transmissions based on the characteristics of the stations of the plurality of groups;
performing a sounding for a group based on the prioritizing;
performing multi-user multiple-input, multiple-output (MU-MIMO) transmission for the group based on the sounding until a first condition is met;
when a first condition is met, then determining whether a lower priority group with buffered data exists; and
for the lower priority group with buffered data, repeating performing the sounding and the MU-MIMO transmission.

30. The computer-readable medium of claim 29, wherein the first condition is that at least one of a maximum transmission time for the MU-MIMO transmission has expired and the buffers for the group are flushed.

31. The computer-readable medium of claim 29, wherein grouping the stations into a plurality of groups includes grouping the stations based on similar amounts of buffered data.

32. The computer-readable medium of claim 29, wherein grouping the stations into a plurality of groups includes grouping the stations based on similar types of buffered data.

33. The computer-readable medium of claim 29, wherein grouping the stations into a plurality of groups includes grouping the stations based on similar freshness of channel state information.

34. A non-transitory, computer-readable medium storing computer-executable instructions for performing dynamic scheduling of soundings, the instructions when executed by a processor cause the processor to execute a process comprising:
determining a plurality of stations in a basic service set (BSS) of an access point (AP);
determining buffered data for each station of the plurality of stations;
grouping the stations into a plurality of groups, the stations of a group having similar characteristics;
ordering the plurality of groups for transmissions based on the characteristics and a transmission history of the stations;
apportioning transmission time to the stations in a group;
performing a sounding for the group based on the ordering;
performing multi-user multiple-input, multiple-output (MU-MIMO) transmission for the group based on the sounding until a first condition is met;
when the first condition is met, then determining whether a second condition is met; and
repeating the performing of the sounding and the performing of the MU-MIMO transmission until the second condition is met.

35. The computer-readable medium of claim 34, wherein the first condition includes at least one of a maximum transmission time for the MU-MIMO transmission having expired and the buffers for the group being flushed.

36. The computer-readable medium of claim 34, wherein the second condition includes at least one of new data having been buffered by the AP and all buffered data having been transmitted.

37. The computer-readable medium of claim 34, wherein grouping the stations into a plurality of groups includes grouping the stations based on similar amounts of buffered data.

38. The computer-readable medium of claim 34, wherein grouping the stations into a plurality of groups includes grouping the stations based on similar types of buffered data.

39. The computer-readable medium of claim 34, wherein grouping the stations into a plurality of groups includes grouping the stations based on similar freshness of channel state information.

40. The computer-readable medium of claim 34, wherein the ordering includes reordering the plurality of groups based on transmission history.

41. The computer-readable medium of claim 34, wherein the apportioning includes re-apportioning the stations of each group based on transmission history.

42. The computer-readable medium of claim 34, wherein apportioning transmission time to the stations in the group results in different time units being apportioned to different stations in the group for the MU-MIMO transmission.

* * * * *